March 26, 1957 R. D. GRAY 2,786,694
ADJUSTABLE MOUNTING FOR HANDLE OF LAWN MOWERS
Filed June 20, 1955
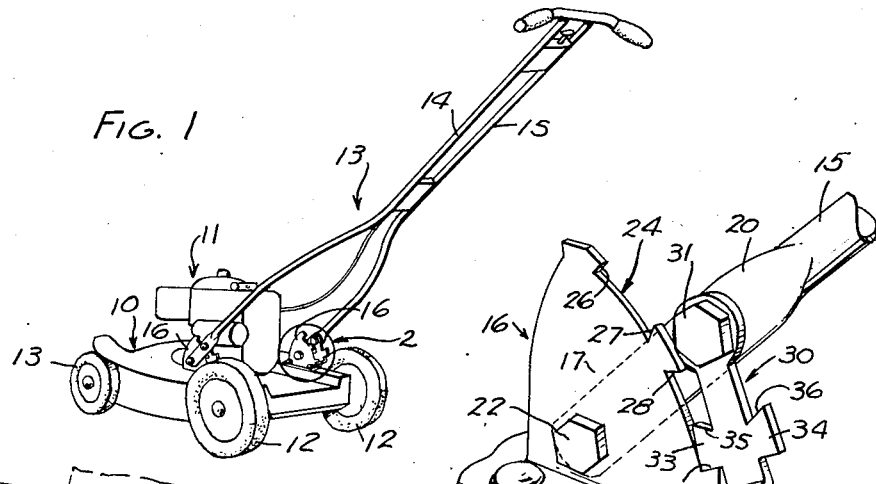
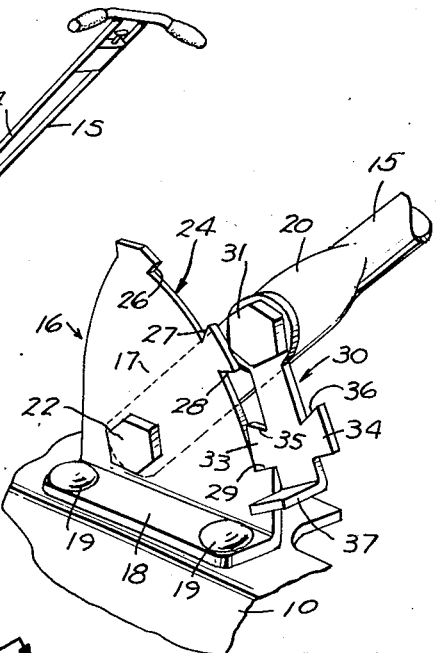
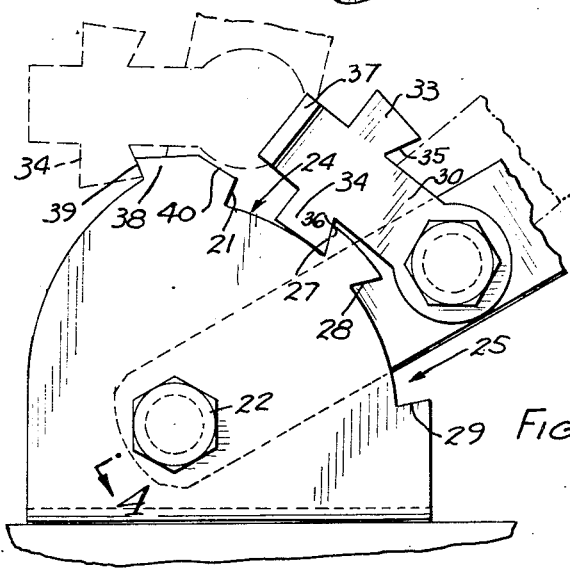
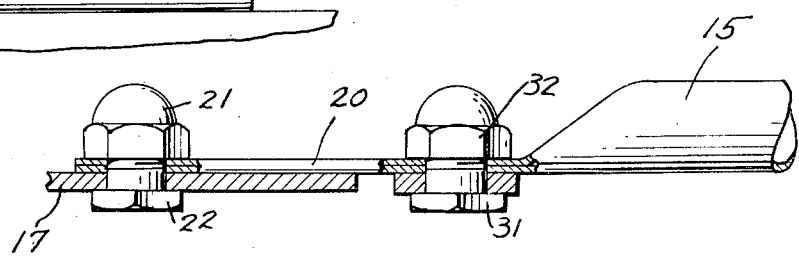
INVENTOR.
RICHARD D. GRAY
BY
Barnes, Kisselle, Laughlin & Raisch
ATTORNEYS

United States Patent Office 2,786,694
Patented Mar. 26, 1957

2,786,694

ADJUSTABLE MOUNTING FOR HANDLE OF LAWN MOWERS

Richard D. Gray, Lansing, Mich., assignor to Motor Wheel Corporation, Lansing, Mich., a corporation of Michigan Application June 20, 1955, Serial No. 516,619

5 Claims. (Cl. 280—47.37)

This invention relates to means for adjustably mounting the handle of lawn mowers, and particularly to means for adjustably mounting the handle of power lawn mowers.

In lawn mowers it is desirable that the handle be mounted in such a manner as to fulfill certain requirements. The position of the handle should be capable of being changed without the use of tools. In addition, the handle should have limited movement relative to the housing of the lawn mower to permit a certain amount of relative movement between the handle and the lawn mower in order that, when mowing on uneven ground, the operator's arms are not constantly being subjected to the bobbing action of the handle caused by the movement of the mower along the uneven ground. This greatly reduces the fatigue of the operator. In addition, the handle should be capable of being adjusted to various positions to accommodate operators of different heights. At each position the handle should have a positive upper stop and lower stop. An upper stop is required to prevent the sudden upward swing of the handle relative to the lawn mower and the backward movement of the mower onto the feet of the operator such as might be occasioned when mowing a steep incline. The stops also permit the operator to raise portions of the mower to prevent running into obstacles and to facilitate steering. This is particularly desirable in lawn mowers of the rotary blade type wherein more than two wheels are used to propel the mower.

It is therefore an object of this invention to provide means for adjustably mounting a handle on a lawn mower which requires no tools for adjustment.

It is a further object of the invention to provide such a means wherein limited movement of the handle relative to the lawn mower housing is permitted at various positions.

It is a further object of the invention to provide such a means wherein at each position there is an upper stop and a lower stop.

It is a further object of the invention to provide such a means wherein the stops are positive in their action.

In the drawings:

Fig. 1 is a perspective view of a lawn mower and a handle embodying the invention.

Fig. 2 is a fragmentary perspective view of the means for adjustably mounting the handle on the lawn mower shown in the circle 2 in Fig. 1.

Fig. 3 is a fragmentary elevational view of the same on an enlarged scale, but showing the handle in a different position.

Fig. 4 is a sectional view taken along the line 4—4 on Fig. 3.

As shown in Fig. 1 a lawn mower housing 10 has mounted thereon an engine 11 and wheels 12 by which it is guided or rolled along the ground. A handle 13 is pivotally and adjustably mounted on the housing 10. The handle shown comprises a pair of tubes 14, 15, the ends of which are spread outwardly and are pivotally connected to brackets 16. Lawn mowers of this type usually include a rotary blade mounted for rotation about a substantially vertical axis and, because of the three or more wheels 12, are stable and merely need to be pushed or guided along the ground by the handle.

As shown in Figs. 2 and 3, the bracket 16 comprises a substantially vertical flat portion 17 and a flange 18 at right angles to the vertical portion 17. The bracket is mounted on the housing 10 by means of bolts 19 passing through the flange 18 and the housing 10. The end of each tube is flattened as at 20 and pivotally connected to the outer surface of the vertical portion 17 of the bracket 16 by means of a nut 21 and bolt 22.

As shown in Fig. 3, the upper edge 23 of the vertical wall 17 is generally arcuate or curved on an arc swung about the axis of the bolt 22. Notches 24 and 25 are cut into the edge 23 of the vertical wall. The notches are provided with reentrant portions 26, 27, 28 and 29. A hook or latch 30 is pivotally connected to the inner surface of the flat end 20 of the tube by a bolt 31 and nut 32. The hook is generally T-shaped and includes ears 33, 34, which are provided with reentrant portions 35, 36, adapted to engage the sides of the notches. In addition, the hook includes a tab 37 extending outwardly from the plane thereof.

As shown in Fig. 1, a similar mounting is provided on the other side of the lawn mower with the tube 14 pivotally connected on the outer surface of the vertical portion of the bracket 16.

With the handle in the position shown in Fig. 2, the ear 33 is slidingly positioned in the notch 25. As shown in Fig. 2, the notches 24 and 25 are wider than the width of the ears 33, 34. Thus, with the handle in the position shown in Fig. 2, the lowermost position of the handle is limited by contact of the ear 33 with the reentrant portion 29 of the notch 25. The handle has limited swinging movement upwardly, the extent of upper movement being limited by contact of the reentrant portion 35 of the ear 33 with the reentrant portion 28 of the notch 25. In this manner a certain amount of relative movement between the handle and the lawn mower is permitted whereby the operator's arms are not constantly being subjected to the bobbing of the handle, which would be caused by the movement of the mower along the uneven ground if the position of the handle relative to the lawn mower were fixed. The upper stop prevents the handle from suddenly swinging upward and allowing the mower to run backward onto the feet of the operator, such as might occur when mowing up a steep incline. In the case of a lawn mower such as shown in Fig. 1, the forward or rear end of the lawn mower may be tipped by moving the handle so that the ear 33 engages the reentrant portions 29 or 28 dependent upon which way the lawn mower is to be tipped.

If the operator is a person of shorter height, the position of the handle may be adjusted by grasping the tab 37 of the latch and pivoting the latch to bring the ear 34 into the notch 24, as is shown in Fig. 3. In this position, the downward swinging movement of the handle is limited by the reentrant portion 27 and the upper position is limited by the reentrant portion 26.

In addition, a storage position is provided by a small abutment 38 on the upper end of the vertical portion 17. The handle may be moved to storage position by grasping the tab 37 and swinging the handle to bring the ear 34 into position for engagement with the surface 39 of abutment 38 as shown by the dotted lines in Fig. 3. The abutment 38 has a portion thereof beveled as at 40 to permit the movement of the latch 30 into storage position.

As shown in Figs. 1 and 2, the mounting of the handle on the outside of the brackets 16 positions the latch toward the interior away from the sides of the lawn mower housing. In this manner, the latch is partially protected and the possibility of the clothes of someone standing near the lawn mower snagging is practically eliminated.

It can thus be seen that I have provided a means for adjustably mounting the handles of lawn mowers wherein the handle is mounted for limited swinging movement in order to prevent fatigue on the arms of the operator. In addition, several positions are provided to accommodate operators of different heights, the limited swinging movement being provided at each of the different positions. At each position, upper and lower stops not only limit the swinging movement but also permit the operator to raise portions of the mower as desired, for example, to prevent running into obstacles and to facilitate steering. The use of reentrant angles in the notches and latch aid in preventing the dislodging of the latch from the notches. A storage position is also provided. All of the adjustments are made without the use of tools by simply changing the position of a latch, which is conveniently provided with a tab for grasping.

I claim:

1. In a lawn mower the combination comprising a housing, a multiplicity of wheels mounted on said housing whereby said housing is stable and may be moved along the ground, a handle pivoted at one end on the housing, means for adjustably retaining the handle in a plurality of angular positions comprising a bracket mounted on said housing, said bracket having an edge portion thereof formed with a plurality of notches therein, a latch pivotally connected to said handle at a point spaced from the pivotal connection of said handle to said housing, said latch being generally T-shaped and comprising an arm having a pair of laterally projecting ears adjacent one end of said arm, said latch being pivotally connected to said handle adjacent the opposite end of said arm, said latch being swingable from one side of said handle to the other whereby when the handle is in one angular position, one of said ears is engageable in one of said notches and when the handle is in another angular position, the other of said ears is engageable in another of said notches.

2. The combination set forth in claim 1 wherein the width of each said notch is greater than the width of each said ear on said latch whereby when an ear engages a notch, the handle has limited angular movement.

3. The combination set forth in claim 2 wherein each said notch is provided with an undercut portion at one extremity thereof and each said ear is provided with a reentrant portion adapted to engage said undercut portion whereby angular movement of said handle toward said undercut portion of said notch causes positive engagement of said reentrant portion of said ear which is engaged with a notch with the undercut portion of said notch thereby positively preventing disengagement of said ear from said notch when the angular movement of the handle is continued to elevate one end of the lawn mower.

4. In a lawn mower comprising a housing, a multiplicity of wheels mounted on said housing whereby said housing is stable and may be moved along the ground, a handle, means for adjustably retaining the handle in a plurality of positions comprising a bracket mounted on said housing, said handle being pivoted at one end on said bracket, said bracket having an arcuate edge portion thereof formed with a plurality of notches therein, a latch pivotally connected to said handle at a point spaced from the pivotal connection of said handle to said bracket, said latch being generally T-shaped and comprising an arm having a pair of laterally projecting ears adjacent one end of said arm, said latch being pivotally connected to said handle adjacent the opposite end of said arm, said latch being swingable from one side of said handle to the other whereby when the handle is in one angular position, one of said ears is engageable in one of said notches and when the handle is in another angular position, the other of said ears is engageable in another of said notches.

5. The combination set forth in claim 4 wherein the width of each said notch is greater than the width of each said ear on said latch whereby when an ear engages a notch, the handle has limited angular movement, said notches being provided with undercut portions at the adjacent extremities thereof, and each said ear being provided with a reentrant portion adapted to engage an undercut portion whereby angular movement of said handle toward said undercut portion of a notch causes positive engagement of said reentrant portion of said ear which is engaged with said notch with the undercut portion of said notch thereby positively preventing disengagement of said ear from said notch when the angular movement of the handle is continued to elevate one end of the lawn mower.

References Cited in the file of this patent
UNITED STATES PATENTS

| | | |
|---|---|---|
| 1,259,489 | Cole | Mar. 19, 1918 |
| 1,877,385 | Casaletto | Sept. 13, 1932 |
| 2,576,727 | Segesman | Nov. 27, 1951 |
| 2,716,559 | Boyce | Aug. 30, 1955 |
| 2,724,598 | Knarzer | Nov. 22, 1955 |